United States Patent [19]
Frystak

[11] Patent Number: 5,580,205
[45] Date of Patent: Dec. 3, 1996

[54] LARGE BALE TRAILER

[76] Inventor: James P. Frystak, R.R. 2 Box 179B, Montrose, Pa. 18801

[21] Appl. No.: 557,419

[22] Filed: Nov. 13, 1995

[51] Int. Cl.⁶ .................................................. B65H 16/02
[52] U.S. Cl. ........................ 414/24.5; 242/557; 414/24.6; 414/911
[58] Field of Search ................. 104/45, 46; 108/103; 248/425; 280/35, 659; 414/24.6, 911; 242/403, 406, 557

[56] References Cited

U.S. PATENT DOCUMENTS

| | | | |
|---|---|---|---|
| 2,214,176 | 9/1940 | Portle | 414/911 X |
| 2,310,036 | 2/1943 | Owens | 242/557 |
| 3,368,773 | 2/1968 | Linderman | 242/403 X |
| 3,843,147 | 10/1974 | Fredricson | 280/43.12 |
| 4,095,706 | 6/1978 | Schwein et al. | |
| 4,648,769 | 3/1987 | Stirling | 414/24.6 |
| 4,755,099 | 7/1988 | Belveal | 414/911 X |
| 4,968,205 | 11/1990 | Bissotto et al. | 414/24.6 |
| 5,158,243 | 10/1992 | Sigle et al. | 242/557 |
| 5,165,836 | 11/1992 | Shonka | 414/111 |
| 5,257,885 | 11/1993 | Reil | 414/24.5 |
| 5,353,740 | 10/1994 | Pellerin | 119/57.92 |
| 5,362,189 | 11/1994 | Lindahl | 414/24.5 |

FOREIGN PATENT DOCUMENTS 2599933  12/1987  France.

*Primary Examiner*—Karen B. Merritt
*Assistant Examiner*—Janice L. Krizek
*Attorney, Agent, or Firm*—Richard C. Litman

[57] ABSTRACT

A four-wheeled vehicle which allows a user to carry and distribute a bale of hay. The vehicle includes a rotatable table, i.e. a turntable, and a frame. The frame includes axles and spindles for the attachment of wheels and bearings for the rotative support of the turntable. The turntable rotates along four support bearings disposed near its periphery and a thrust bearing disposed near the center of the turntable. Steering is accomplished by pivoting a handle attached to the front axle, above which is a pair of six inch discs pivotally engaged to each other by a pin. The discs distribute the load and reduce the force on the pin, i.e. pivot point, thereby resulting in an easily steered vehicle.

15 Claims, 3 Drawing Sheets

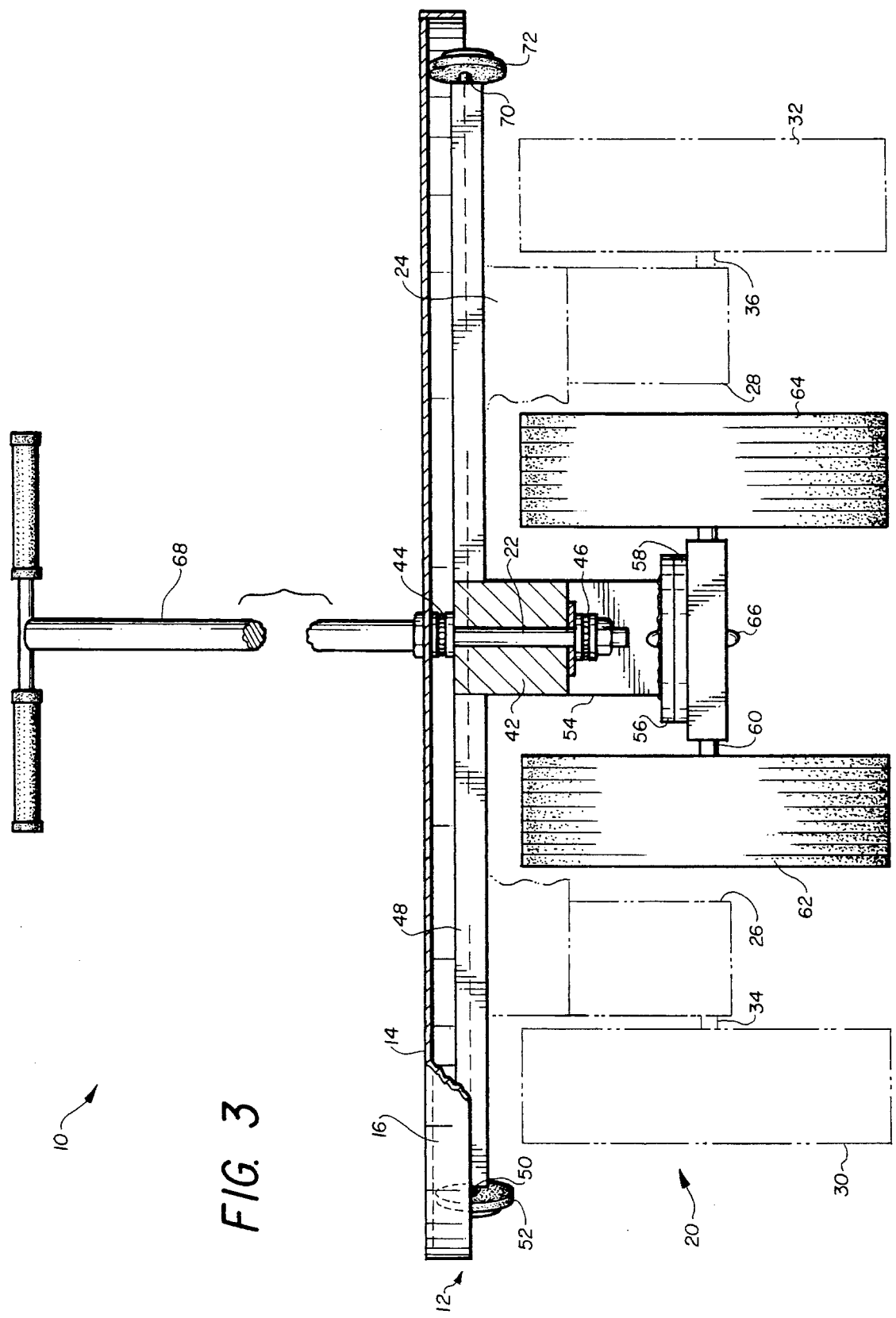

LARGE BALE TRAILER

BACKGROUND OF THE INVENTION

1. Field of the Invention

The present invention relates to a trailer for carrying and unloading large hay bales.

2. Description of the Prior Art

The present invention relates to a large bale trailer which provides for the transportation of bales of hay. Unlike other apparatuses which merely transport bales, of which U.S. Pat. No. 4,968,205 issued Nov. 6, 1990, to Bernard Bissotto, et al., is an example, the instant invention includes a rotatable table on which the bale of hay is transported. This feature allows for the easy removal of hay from the bale. Other inventions, such as those shown in U.S. Pat. No. 3,843,147 issued Oct. 22, 1974, to Yngve Fredricson, and U.S. Pat. No. 5,158,243 issued Oct. 27, 1992, to Ernest R. Sigle, et al., allow for the transportation and dispensing of other objects.

Although French Patent No. 2,599,933, issued on Dec. 18, 1987, teaches a vehicle for transporting a bale of hay and a rotatable table for rotating the bale, there are many differences between this patent and the instant invention. Most particularly, the rotatable table of the instant invention is supported at five points, by a thrust bearing and four outer support bearings, and in the apparatus depicted in the French patent, support is provided by only one center component. The weight distribution provided by the outer support points of the instant invention reduces the likelihood of the apparatus' tilting due to the great weight of the bale.

The balance and stability provided by the five support points allows for other advantages of the instant invention over the prior art. The nature of the support in the French patent requires that the frame be relatively close to the ground because the use of only one support necessitates a low center of gravity. Additionally, the presence of only one support member requires that the wheels be placed outside of the area defined by the periphery of the rotatable table for increased support. In contrast, the instant invention with its five load bearing members does not require a low center of gravity or that the wheels be spaced relatively far apart. Thus, the instant invention has a higher frame with a good deal of ground clearance and wheels under the rotatable table so the axles and spindles are protected from falling hay and are not subject to becoming entangled with it.

Finally, the steering mechanism of the instant invention utilizes a pair of six inch discs which are pivotally attached to one another at a pivot point by a bolt. The discs distribute the load and less load is carried by the pivot of the instant invention. The pivot of the French patent is the front wheel, which is also load bearing. Because the pivot of the instant invention bears a relatively smaller load, the apparatus of the instant invention is easier to steer and puts less wear on its pivot.

SUMMARY OF THE INVENTION

The instant invention relates to a four-wheeled vehicle which allows a user to carry and distribute a bale of hay. The vehicle includes a rotatable table, i.e. a turntable, and a frame. The frame includes axles and spindles for the attachment of wheels and bearings for the rotative support of the turntable. The turntable rotates along four support bearings disposed near its periphery and a thrust bearing disposed near the center of the turntable. Steering is accomplished by pivoting a handle attached to the front axle, above which is a pair of six inch discs pivotally engaged to each other by a pin. The discs distribute the load and reduce the force on the pin, i.e. pivot point, thereby resulting in an easily steered vehicle.

Accordingly, it is a principal object of the invention to provide a vehicle for supporting and rotating a bale of hay.

It is another object of the invention to provide this support at a plurality of points to give a great deal of stability to the vehicle.

It is a further object of the invention to provide a vehicle having substantial ground clearance and with wheels located underneath the turntable to eliminate the likelihood of their entanglement with hay.

Still another object of the invention is to provide a vehicle that can be easily steered regardless of the weight of hay it carries.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is a rear sectional view taken across the section line 3—3 in FIG. 2 showing the rear of the flat stock cut away, and showing the rear tubes and rear wheels in broken lines.

Similar reference characters denote corresponding features consistently throughout the attached drawings.

DETAILED DESCRIPTION OF THE PREFERRED EMBODIMENT

Figure 1:
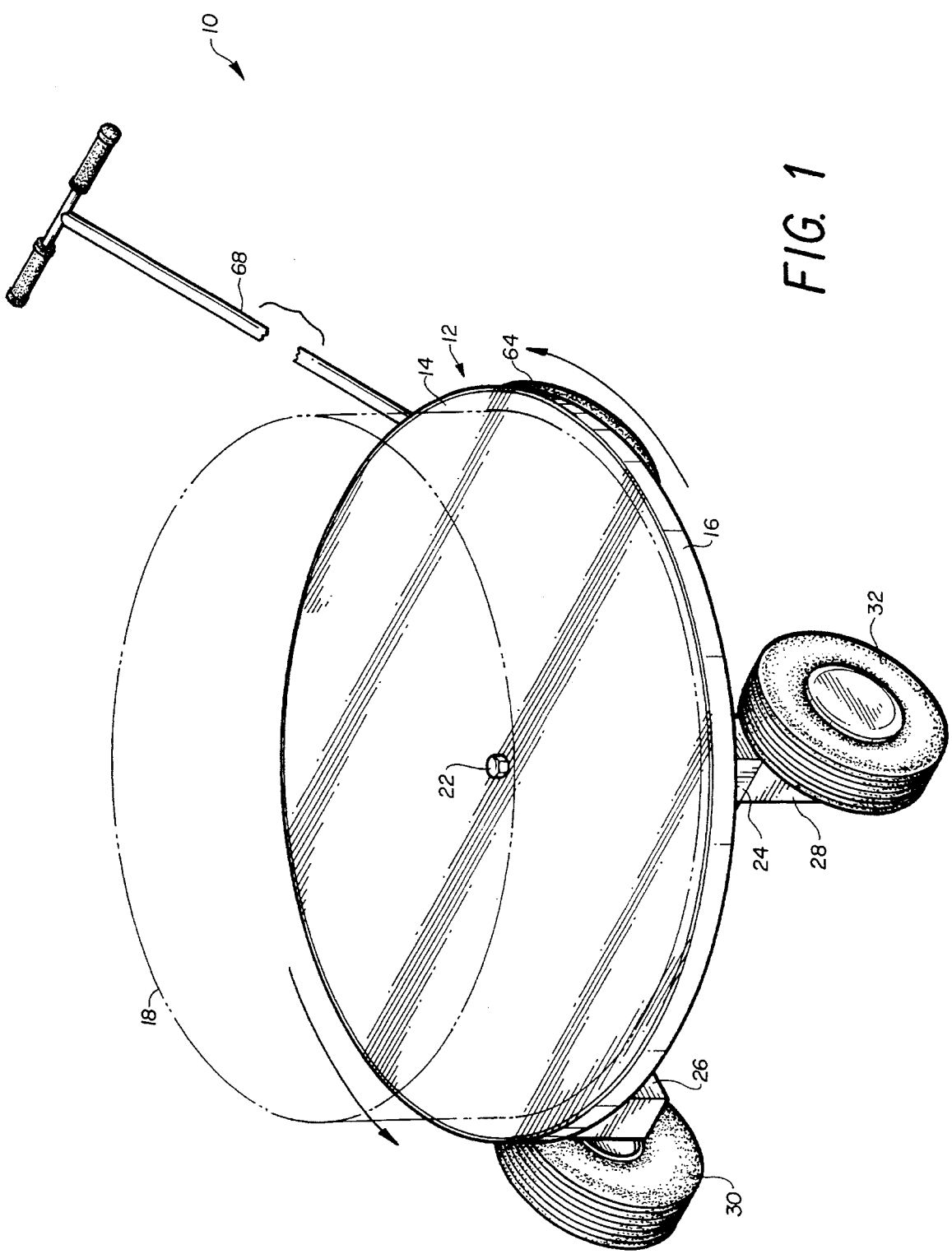
FIG. 1 is an environmental, top perspective view of the large bale trailer.
Figure 2:
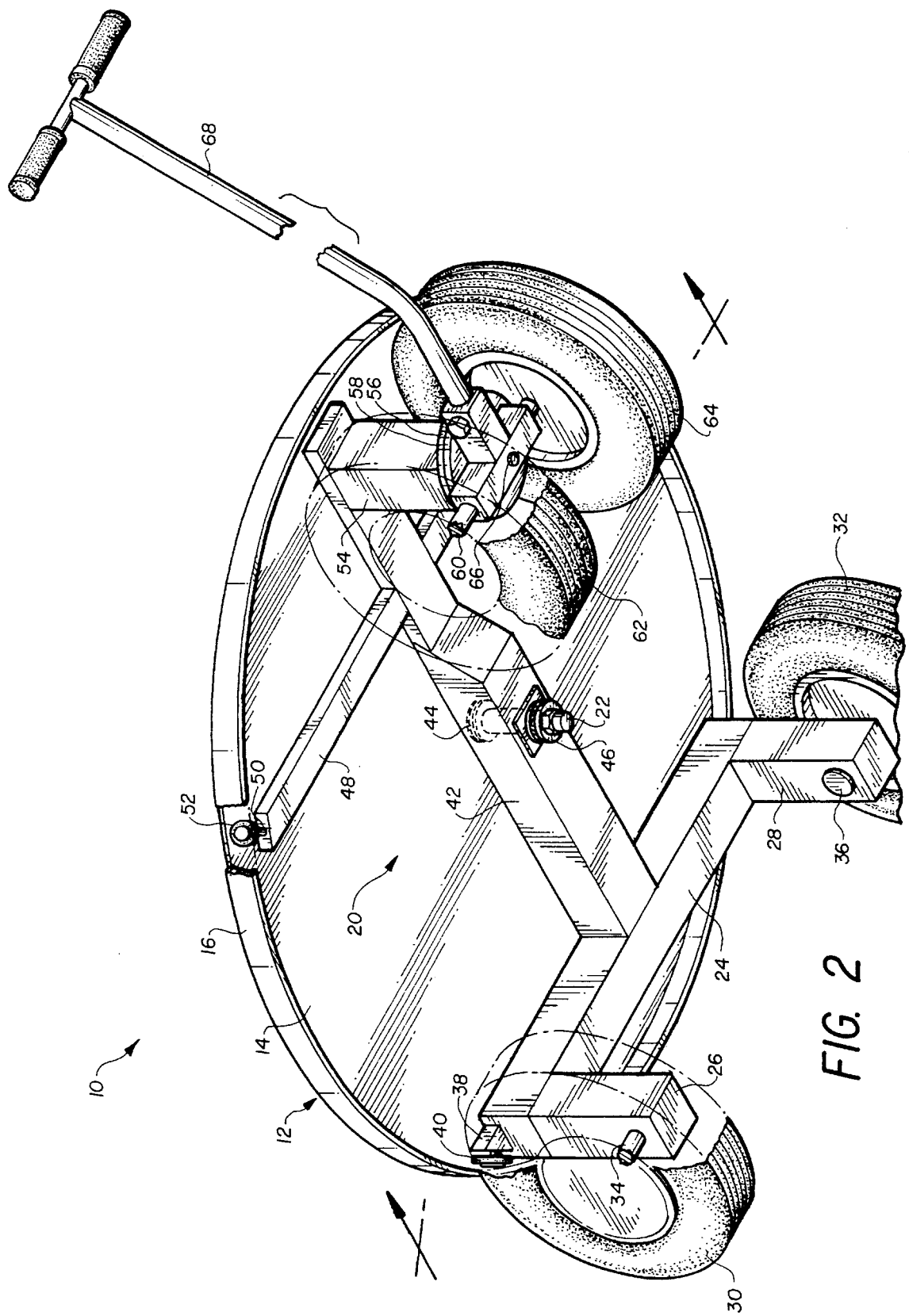
FIG. 2 is a bottom perspective view of the large bale trailer.

The present invention is a large bale trailer 10 for transporting and dispensing a bale of hay 18. As seen in FIG. 1, the invention has a turntable 12 which rotates about a frame best seen in FIG. 2. The turntable includes a disc 14 with flat stock 16 rolled around its periphery to provide support. The width of the flat stock is greater than the thickness of the disc, resulting in a peripheral lip around the disc. This lip is best seen in FIGS. 2 and 3. Also seen in FIG. 1 is the upper end of a bolt 22 which holds the thrust bearings 44 and 46, which are discussed in conjunction with the description of FIG. 2. The bolt 22 can extend upwards out of the disc 14 and through the center of a bale of hay or it can protrude just beyond the upper surface of the disc, as shown in FIG. 1.

Referring to FIG. 2, the frame 20 includes a rear assembly, a center assembly, and a front assembly. The rear assembly includes a rear bearing tube 24 having left and right down tubes and 28 at either end, which have wheels 30 and 32 attached to their lower ends by spindles 34 and 36. The rear bearing tube 24 also includes at its left end a left rear bearing support 38 and a left rear bearing 40, along which the turntable 12 rotates. The right end of the rear bearing tube 24 has a right rear bearing support and a right rear bearing, features which are not shown but are identical to the left rear support 38 and the left rear bearing 40.

The turntable 12 is rotatively supported by four outer bearings, the left rear 40, the right rear (not shown), the left front 52, and the right front 72, and a thrust bearing 44 located at the center of the disc 14. The outer bearings are aligned at 45 degree angles with respect to their respective bearing tube. This alignment orients the bearings away from the center of the disc (direction dependent on the specific bearing). This support system provides a great deal of balance and proper weight distribution, eliminating the possibility of the trailer's tilting. Because additional support is not needed, the frame of the trailer does not need to be close to the ground nor do the wheels need to extend beyond the area defined by the periphery of the turntable 12, resulting in the provision of a large amount of ground clearance and reducing the likelihood that hay will become entangled with the wheel spindles or axles.

The center assembly includes a center tube 42 extending forwardly from the rear bearing tube 24. A thrust bearing 44, whose upper washer is mounted on the lower surface of the disc 14 and whose lower washer is mounted on the top of the center tube 42 and secured by the bolt 22, provides rotative support to the turntable 12. As best seen in FIG. 3, ball bearings, which ride in tracks (not shown) between the two washers, maintain rotative engagement between the two washers. Additionally, a thrust bearing 46 is mounted to the bottom of the center tube 42 and secured by the bolt 22. The purpose of the thrust bearing 46 is to absorb the rotational movement created when the turntable 12 is rotated, preventing the bolt attachment from becoming loosened. The center tube includes a front and a rear portion, the front portion tapering off, i.e. providing the center tube with a reduced thickness, to provide clearance to the front wheels 62 and 64.

The front assembly includes a front bearing tube 48 perpendicularly oriented to the center tube 42 at a point near the front of the center tube. The left and the right ends of the front bearing tube 48 have left and right front bearing supports 50 and 70, which are in turn connected to bearings 52 and 72. Forwardly of the front bearing tube 48, a front down tube 54 extends downwardly from the center tube 42. A first steering disc 56 is welded to the lower end of the front down tube 54. This first steering disc 56 is pivotally attached to a second steering disc 58, which is mounted on the front axle 60. The axle rotatively supports left and right front wheels 62 and 64. The attachment of the two steering discs 56 and 58 is facilitated by a pin 66 and a layer of grease or other lubricant between the two discs allows for easy turning. This steering arrangement allows for the discs to bear the weight, distributing it away from the pivot point, and reduces the wear on the pivot and makes the steering relatively easy. The invention also incudes a handle 68, which assists the user in steering the trailer 10.

With reference to FIG. 3, it can be seen that all of the wheels are within the area defined by the periphery of the turntable 12. This orientation of the wheels is allowed by the balance provided by the five bearings, as noted above, and reduces the likelihood that hay will become entangled in the wheels. This figure also illustrates the relationship between the width of the flat stock 16 and the thickness of the disc 14. This relationship, as noted above, provides a peripheral lip on the bottom of the turntable 12. The flat stock 16 provides support to the disc 14, but because the entire turntable 12 is not as wide as the flat stock 16, clearance is maximized.

It is to be understood that the present invention is not limited to the sole embodiment described above, but encompasses any and all embodiments within the scope of the following claims.

I claim:

1. A material handler comprising:

a turntable: and a frame including a plurality of bearings located near the periphery of said turntable and at least one bearing near the center of said turntable for providing rotative support to said turntable, said frame further including a center tube and a rear bearing tube substantially perpendicular to said center tube near the rear end of said center tube and a front bearing tube substantially perpendicular to said center tube near the front end of said center tube, wherein one of said plurality of bearings is disposed at each end of said rear bearing tube and said front bearing tube.

2. The handler of claim 1 wherein said frame includes a steering mechanism which distributes weight about a pivot point, resulting in ease of steering.

3. The handler of claim 2 wherein said steering mechanism includes a pair of discs pivotally engaged about a pin.

4. The handler of claim 1 wherein said frame further comprises a plurality of wheels.

5. The handler of claim 1 wherein said at least one bearing is disposed on the upper side of said center tube.

6. The handler of claim 1 wherein a rotational axis of each of said bearings disposed on said front and rear bearing tubes is disposed at a 45 degree angle with respect to a longitudinal axis of each of said bearing tubes.

7. The handler of claim 1 wherein said center tube has a thrust bearing attached to its underside.

8. A material handler including:

a turntable; and a frame including:

a rear assembly having a rear bearing tube including a pair of bearings for providing rotative support to said turntable;

a center assembly including a center tube attached to said rear bearing tube, said center tube having a thrust bearing mounted to it to provide rotative support to said turntable; and a front assembly having a pair of bearings for providing rotative support to said turntable.

9. The handler of claim 8 wherein said front assembly includes a pair of wheels attached to an axle having a pivot point at the center of said axle.

10. The handler of claim 9 wherein said front assembly further includes means to distribute the weight of the material above said pivot point to reduce the stress on said pivot point and so that the handler can be easily steered.

11. The handler of claim 10 wherein said means to distribute the weight includes a pair of discs pivotally engaged with one another.

12. A vehicle for carrying cylindrical bales of hay, comprising:

a turntable including:

a disc having a thickness and a peripheral edge; and flat stock wrapped around said peripheral edge of said disc, said flat stock having a width greater than said thickness of said disc; and a frame including:

a rear assembly including:

a rear bearing tube having a left end and a right end;

a left and a right rear down tube, said left rear down tube extending downwardly from said left end of said rear bearing tube and having a left spindle and a left rear wheel rotatively supported by said left spindle, said right rear down tube extending downwardly from said right end of said rear bearing tube and having a right spindle and a right rear wheel rotatively supported by said right spindle; and a left and a right rear bearing support, said left rear bearing support extending rearwardly and leftwardly from said left end of said rear bearing tube and having a left rear bearing supported at the leftmost end of said left rear bearing support, said right rear bearing support extending rearwardly and rightwardly from said right end of said rear bearing tube and having a right rear bearing supported at the rightmost end of said right rear bearing support, said rear bearings providing rotative support to said turntable;

a center assembly including:

a center tube extending forwardly from the midpoint of said rear bearing tube and having a front end and a rear end; and a thrust bearing attached to the top of said center tube and rotatively supporting said turntable; and a front assembly including:

a front bearing tube having a left end and a right end and attached near said front end of said center tube at the midpoint of said front bearing tube;

a left and a right front bearing support, said left front bearing support extending forwardly and leftwardly from said left end of said front bearing tube and having a left front bearing supported at the leftmost end of said left front bearing support, said right front bearing support extending forwardly and rightwardly from said right end of said front bearing tube and having a right front bearing supported at the rightmost end of said right front bearing support, said front bearings providing rotative support to said turntable;

a front down tube extending downwardly from said center tube, said front down tube disposed forwardly of said front bearing tube and having an upper and a lower end;

a first steering disc having an upper and a lower surface, said upper surface of said first steering disc attached to said lower end of said front down tube;

a second steering disc having an upper and a lower surface, said upper surface of said second steering disc separated from said lower surface of said first steering disc by only a layer of lubricant and rotatively mounted about a pin extending through said first and said second steering discs; and a front axle rotatively supporting a front wheel at each end, said axle attached to said lower surface of said second steering disc;

a pull handle with grips attached to said second disc, whereby movement of said pull handle in a plane parallel with said second disc results in the rotation of said second disc with respect to said first disc and the turning of the vehicle.

13. The vehicle of claim 12 wherein said front bearing supports include bolts angled 45 degrees from said front bearing tube and said rear bearing supports comprise bolts angled at 45 degrees from said rear bearing tube.

14. The vehicle of claim 12 wherein said center tube includes a rear portion being a larger tube and a front portion being a smaller tube such that said front wheels are not impeded by the center tube upon rotation of said front wheels.

15. The vehicle of claim 12 wherein said center tube has a thrust bearing attached to its underside.

* * * * *